(12) United States Patent
Sun et al.

(10) Patent No.: US 12,200,505 B2
(45) Date of Patent: Jan. 14, 2025

(54) DATA PROCESSING METHOD AND APPARATUS

(71) Applicant: HUAWEI TECHNOLOGIES CO., LTD., Guangdong (CN)

(72) Inventors: Qiang Sun, Chengdu (CN); Jindong Peng, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 324 days.

(21) Appl. No.: 17/831,570

(22) Filed: Jun. 3, 2022

(65) Prior Publication Data

US 2022/0295294 A1    Sep. 15, 2022

Related U.S. Application Data

(63) Continuation of application No. PCT/CN2019/123068, filed on Dec. 4, 2019.

(51) Int. Cl.
*H04W 24/02* (2009.01)
*H04W 16/08* (2009.01)
*H04W 16/20* (2009.01)

(52) U.S. Cl.
CPC .......... *H04W 16/20* (2013.01); *H04W 16/08* (2013.01); *H04W 24/02* (2013.01)

(58) Field of Classification Search
CPC ..... H04W 16/20; H04W 16/08; H04W 24/02; H04W 88/085
See application file for complete search history.

(56) References Cited

U.S. PATENT DOCUMENTS

| 2016/0227396 | A1* | 8/2016 | Lee ................... H04W 8/18 |
| 2016/0309350 | A1 | 10/2016 | Dai |
| 2021/0006299 | A1* | 1/2021 | Kadous ............. H04W 24/02 |

FOREIGN PATENT DOCUMENTS

| CN | 104067689 A | 9/2014 |
| CN | 104619029 A | 5/2015 |
| CN | 105635980 A | 6/2016 |
| CN | 105981417 A | 9/2016 |
| CN | 106301444 A | 1/2017 |
| CN | 109348511 A | 2/2019 |
| CN | 109417832 A | 3/2019 |

(Continued)

OTHER PUBLICATIONS

Extended European Search Report issued in European Application No. 19955248.0 on Oct. 17, 2022, 10 pages.

(Continued)

*Primary Examiner* — Chuong A Ngo
(74) *Attorney, Agent, or Firm* — Fish & Richardson P.C.

(57) ABSTRACT

Disclosed are a data processing method and apparatus, which relate to the field of wireless communication technologies. In one example, a BBU determines an amount of user data in a logical cell covered by the BBU, where the amount of the user data in the logical cell covered by the BBU is a total amount of to-be-processed data in the logical cell covered by the BBU; and the BBU configures, based on the amount of the user data in the logical cell covered by the BBU, M L1 processing resources whose data processing capacity meets the amount of the user data in the logical cell covered by the BBU, and processes the to-be-processed data by using the M L1 processing resources.

20 Claims, 7 Drawing Sheets

(56) References Cited

FOREIGN PATENT DOCUMENTS

| | | |
|---|---|---|
| CN | 110167031 A | 8/2019 |
| CN | 110290533 A | 9/2019 |
| EP | 2783547 A1 | 10/2014 |
| EP | 3232625 A1 | 10/2017 |
| WO | 2018098695 A1 | 6/2018 |
| WO | 2018227346 A1 | 12/2018 |

OTHER PUBLICATIONS

Manli et al., "CN104619029B—Method and Device for Allocating Baseband Pool Resources under Centralized Cellular Network Architecture," English translation, 11 pages.

PCT International Search Report and Written Opinion issued in International Application No. PCT/CN2019/123068 on Aug. 28, 2020, 16 pages (with English translation).

Office Action in Chinese Appln. No. 201980101546.7, dated Dec. 19, 2022, 8 pages.

Office Action in European Appln. No. 19955248.0, mailed on Nov. 15, 2024, 5 pages.

\* cited by examiner

DATA PROCESSING METHOD AND APPARATUS

CROSS-REFERENCE TO RELATED APPLICATIONS

This application is a continuation of International Application No. PCT/CN2019/123068, filed on Dec. 4, 2019, the disclosure of which is hereby incorporated by reference in its entirety.

TECHNICAL FIELD

Embodiments of this application relate to the field of wireless communication, and in particular, to a data processing method and apparatus.

BACKGROUND

An indoor distribution system is a solution used to improve a mobile communication environment in a building. A principle of the indoor distribution system is to uniformly distribute signals of a mobile communication base station to every indoor corner by using various indoor antennas, so as to ensure ideal signal coverage in an indoor area. At present, mainstream indoor distribution systems on the market may include a distributed antenna system (DAS) and a digital indoor system (DIS).

As shown in FIG. 1, the DIS may include a baseband unit (BBU), a radio hub (rHub), and a pico remote radio unit (pRRU). The BBU is connected to one or more rHubs, and each rHub may be connected to one or more pRRUs. The BBU may perform baseband processing on downlink data sent to a terminal, and send processed downlink data to one or more pRRUs by using the rHub, and the one or more pRRUs send the processed downlink data to the terminal to implement uniform distribution of indoor radio signals. Similarly, the terminal may send data to the rHub by using the one or more pRRUs, the rHub may merge the received uplink data and send the uplink data to the BBU, and the BBU performs baseband processing on the merged data to obtain uplink data.

Refer to FIG. 2. The BBU may include L3 (layer 3), L2 (layer 2), and L1 (layer 1). L1 is configured with a plurality of L1 processing resources, and each L1 processing resource may implement a baseband processing function. Currently, the L1 processing resources are allocated based on physical cells, and each physical cell is fixedly configured with one L1 processing resource. For example, as shown in FIG. 2, a physical cell 1 and a physical cell 2 exist in the DIS, the physical cell 1 corresponds to an L1 processing resource 1, and the physical cell 2 corresponds to an L1 processing resource 2. If a larger quantity of physical cells exist, more L1 processing resources need to be configured. Because the L1 processing resource is consumed based on an amount of to-be-processed user data in a corresponding physical cell, if an amount of to-be-processed user data is relatively small or no service occurs in a physical cell, that is, no to-be-processed user data exists, an L1 processing resource corresponding to the physical cell cannot be well used, or even not used, resulting in a waste of the L1 processing resource.

SUMMARY

Embodiments of this application provide a data processing method and apparatus to solve a problem of a waste of an L1 processing resource of a BBU.

To achieve the foregoing objective, the following technical solutions are used in embodiments of this application.

According to a first aspect, this application provides a data processing method, including: A BBU determines a total amount of to-be-processed data in a logical cell covered by the BBU, configures, based on the total amount of the to-be-processed data, M L1 processing resources whose data processing capacity meets an amount of user data in the logical cell covered by the BBU, and processes the to-be-processed data by using the M L1 processing resources.

Based on the method according to the first aspect, the BBU can dynamically configure an L1 processing resource based on the total amount of the to-be-processed data in the logical cell in coverage of the BBU, that is, a user service situation, so that an amount of user data that can be processed by the configured L1 processing resource can just meet the total amount of the to-be-processed data, and the to-be-processed data is processed by using the configured L1 processing resource. In this way, the configuration of the L1 processing resource can be associated with the user service situation in the coverage of the BBU, and the L1 processing resource can be decoupled from the physical cell. Unlike that in a conventional technology, there is no need to associate the L1 processing resources with the physical cell, and fixedly configure one L1 processing resource for one physical cell, thereby avoiding a problem of a waste of the L1 processing resource caused by one physical cell being fixedly configured with one L1 processing resource, and improving utilization of the L1 processing resource.

In a possible design, with reference to the first aspect, that a data processing capacity of the M L1 processing resources meets the amount of the user data in the logical cell covered by the BBU includes: The to-be-processed data includes M parts of user data, the M parts of user data correspond to the M L1 processing resources, and a data processing capacity of each L1 processing resource is greater than or equal to an amount of one part of user data corresponding to the L1 processing resource.

In a possible design, with reference to the first aspect or the possible design of the first aspect, that the BBU configures M L1 processing resources based on the amount of the user data in the logical cell covered by the BBU includes: configuring one L1 processing resource if the amount of the user data in the logical cell covered by the BBU is less than or equal to a processing threshold of one physical cell; or configuring two L1 processing resources if the amount of the user data in the logical cell covered by the BBU is greater than a processing threshold of one physical cell and less than or equal to twice the processing threshold of one physical cell.

In a possible design, with reference to the first aspect or the possible design of the first aspect, the to-be-processed data includes M parts of user data, and the method further includes: The BBU configures a correspondence between cache addresses of the M parts of user data and the M L1 processing resources, and configures a correspondence between the cache addresses of the M parts of user data and N radio hubs rHubs.

Based on this possible design, a data path between the L1 processing resource and the rHub can be established.

In a possible design, with reference to the first aspect or the possible design of the first aspect, that the BBU processes the to-be-processed data by using the M L1 processing resources includes: The BBU determines an L1 processing resource corresponding to a cache address of any one of the M parts of user data based on the cache address of the user data and the first correspondence, and processes the user data by using the determined L1 processing resource.

In a possible design, with reference to the first aspect or the possible design of the first aspect, the method further includes: The BBU determines at least one rHub corresponding to the cache address of the user data based on the second correspondence, and sends user data processed by using the L1 processing resource to the at least one rHub.

In a possible design, with reference to the first aspect or the possible design of the first aspect, the method further includes: The BBU measures signal quality of at least one pRRU connected to a rHub, and sends configuration information to the rHub based on a measurement result, where the configuration information is used to indicate an on or off state of each of the at least one pRRU. For example, if the signal quality of the pRRU is relatively low, the pRRU is set to an off state, and if the signal quality of the pRRU is relatively high, the pRRU is set to an on state.

Based on this possible design, the on or off state of the pRRU can be adjusted based on the signal quality of the pRRU in a physical cell, and some pRRUs rather than all pRRUs in the physical cell are used to transmit data. For example, several pRRUs that are relatively close to a terminal and have good signal quality are used to transmit data to reduce power consumption of pRRUs in the physical cell. In addition, a rHub does not need to establish uplink and downlink channels with all the pRRUs, and does not need to transmit data on a relatively large quantity of uplink and downlink channels, thereby avoiding signal interference caused by data transmission on redundant uplink and downlink channels, and improving data transmission performance.

According to a second aspect, this application provides a communication apparatus. The communication apparatus may be a BBU or a chip or a system-on-a-chip in the BBU, or may be a functional module in the BBU for implementing the method according to any one of the first aspect or the possible design of the first aspect. The communication apparatus may implement functions performed by the BBU in the foregoing aspect or the possible designs, and the functions may be implemented by hardware executing corresponding software. The hardware or the software includes one or more modules corresponding to the foregoing functions. For example, the communication apparatus includes: a processing unit, where the processing unit is configured to determine a total amount of to-be-processed data in a logical cell covered by the BBU, configure, based on the total amount of the to-be-processed data, M L1 processing resources whose data processing capacity meets an amount of user data in the logical cell covered by the BBU, and process the to-be-processed data by using the M L1 processing resources.

For a specific implementation of the communication apparatus, refer to a behavior function of the BBU in the data processing method provided according to any one of the first aspect or the possible designs of the first aspect. Details are not described again herein. Therefore, the provided communication apparatus can achieve same beneficial effects as any one of the first aspect or the possible designs of the first aspect.

According to a third aspect, a communication apparatus is provided, where the communication apparatus may be a BBU or a chip or a system-on-a-chip in the BBU. The communication apparatus can implement functions performed by the BBU according to each of the foregoing aspects or each of the possible designs, and the functions can be implemented by hardware. For example, in a possible design, the communication apparatus may include a processor and a transceiver. The processor is configured to determine a total amount of to-be-processed data in a logical cell covered by the BBU, configure, based on the total amount of the to-be-processed data, M L1 processing resources whose data processing capacity meets an amount of user data in the logical cell covered by the BBU, and process the to-be-processed data by using the M L1 processing resources. In still another possible design, the communication apparatus may further include a memory. The memory is configured to store computer-executable instructions and data that are necessary for the communication apparatus. When the communication apparatus is running, the processor executes the computer-executable instruction stored in the memory, so that the communication apparatus performs the data processing method according to any one of the first aspect or the possible designs of the first aspect.

According to a fourth aspect, a computer-readable storage medium is provided, where the computer-readable storage medium may be a readable non-volatile storage medium, the computer-readable storage medium stores computer instructions or a program, and when the computer instructions or the program is run on a computer, the computer is enabled to perform the data processing method according to any one of the first aspect or the possible designs of the first aspect.

According to a fifth aspect, a computer program product including instructions is provided. When the computer program product runs on a computer, the computer is enabled to perform the data processing method according to any one of the first aspect or the possible designs of the foregoing aspect.

According to a sixth aspect, a communication apparatus is provided, where the communication apparatus may be a BBU or a chip or a system-on-a-chip in the BBU, and the communication apparatus includes one or more processors and one or more memories. The one or more memories are coupled to the one or more processors. The one or more memories are configured to store computer program code. The computer program code includes computer instructions, and when the one or more processors execute the computer instructions, the communication apparatus is enabled to perform the data processing method according to any one of the first aspect or the possible designs of the first aspect.

For technical effects achieved by any one of the design manners of the third aspect to the sixth aspect, refer to the technical effects achieved by any one of the first aspect or the possible designs of the first aspect. Details are not described again.

According to a seventh aspect, an embodiment of this application provides a DIS, where the DIS may include the BBU, the rHub, and the pRRU according to the second aspect to the sixth aspect.

DESCRIPTION OF EMBODIMENTS

The following describes implementations in embodiments of this application in detail with reference to the accompanying drawings.

Figure 3:
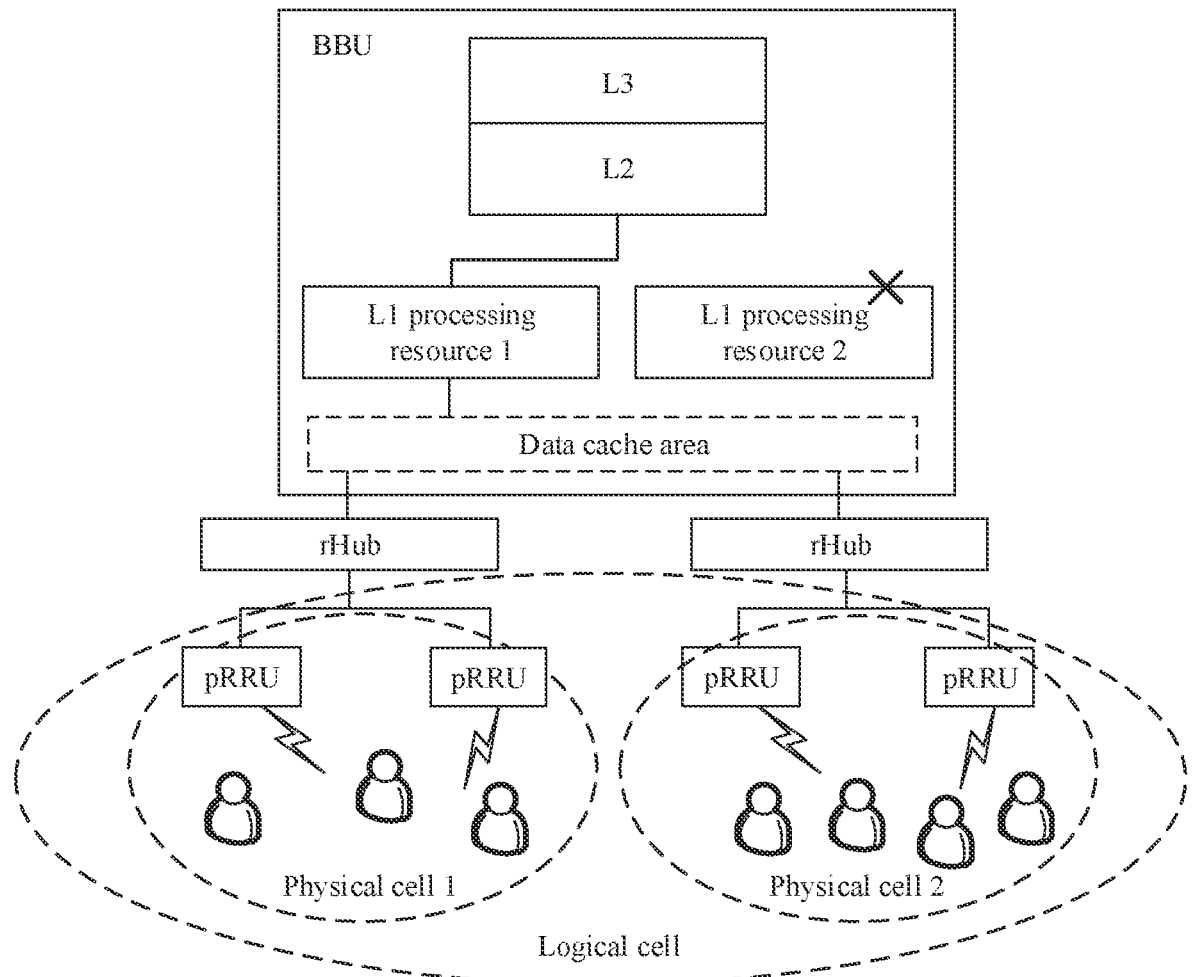
FIG. 3 is a schematic diagram of an architecture of a DIS according to an embodiment of this application.

FIG. 3 is a schematic diagram of an architecture of a DIS according to an embodiment of the present invention. As shown in FIG. 3, the DIS may include: a BBU, one or more rHubs, and one or more pRRUs. The BBU may be connected to the one or more rHubs by using a common public radio interface (CPRI). Each rHub may be connected to the one or more pRRUs by using a cable. pRRUs connected to a same rHub may form one physical cell, and one or more physical cells may form a logical cell. The BBU may send downlink data to the rHub, the rHub may forward the received downlink data to each pRRU, and the pRRU sends the downlink data to a plurality of users. After receiving uplink data sent by a user, each pRRU sends the received uplink data to the rHub, and the rHub performs radio frequency combination on the uplink data and then sends the uplink data to the BBU. Downlink data/uplink data forwarded by each pRRU in a same physical cell is the same.

In embodiments of the present invention, for ease of description, the baseband unit in embodiments and the accompanying drawings of the specification is named: BBU (baseband unit), the radio hub is named: rHub (radio hub), and the pico remote radio unit is named: pRRU (pico remote radio unit). It should be noted that each unit module shown in FIG. 3 may alternatively be named with other English abbreviations. This is not limited in embodiments of the present invention. In the present invention, the data processing method according to embodiments of the present invention is described only by taking the baseband unit as the BBU, the radio hub as the rHub, and the pico remote radio unit as the pRRU.

The BBU may include L3 (layer 3), L2 (layer 2), and L1 (layer 1). L3 is mainly configured to access a core network and obtain downlink data and the like from the core network. L2 may include a packet data convergence protocol (PDCP) layer, a radio link control (RLC) layer, a media access control (MAC) layer, and the like. L1 may be configured with a plurality of L1 processing resources, and each of the L1 processing resources may have baseband processing functions such as cyclic redundancy check (CRC), scrambling, modulation, mapping precoding, resource mapping, orthogonal frequency division multiplexing (OFDM) signal generation, in-phase quadrature (I/Q) modulation, and intermediate and radio frequency processing. BBUs are usually deployed in an equipment room in a centralized manner.

The rHub mainly implements functions such as input/output (I/O) signal exchange, I/O signal combining and splitting, and supplying power to the pRRU.

The pRRU mainly implements radio frequency processing such as mutual conversion between a baseband or intermediate frequency signal and a radio frequency signal, and completes signal transmission and reception. The radio frequency processing may include processing such as digital predistortion, up-conversion, and power amplification. The pRRU may be deployed at a far end, such as a position near an antenna.

It should be noted that FIG. 3 is only an example drawing, and a quantity of devices and a quantity of users included in the figure are not limited. In addition, in addition to the devices shown in FIG. 3, the architecture may further include other devices. The name of each device and naming of each link in FIG. 3 are not limited. In addition to the name shown in FIG. 3, each device may be further named another name, which is not limited.

To resolve an existing problem of a waste of an L1 processing resource, in the architecture shown in FIG. 3, a data cache area is added between an L1 processing resource on the BBU side and the rHub, and the data cache area can cache to-be-processed data in a logical cell covered by the DIS. The BBU can view an amount of to-be-processed data in the data cache area, and configure, based on the amount of the to-be-processed data, an L1 processing resource for processing the to-be-processed data. For example, one L1 processing resource is configured if the amount of to-be-processed data is less than a processing threshold of one physical cell (for example, 50% of a maximum amount of data that can be processed by one physical cell); or two L1 processing resources are configured if the amount of to-be-processed data is greater than a processing threshold of one physical cell, but less than twice the processing threshold of one physical cell. That is, the physical cell is decoupled from the L1 processing resource, and the L1 processing resource is dynamically configured based on a service use situation of a user in a coverage area of the DIS, without needing to fix one L1 processing resource for each physical cell as in a conventional technology, thereby improving utilization of the L1 processing resource.

Figure 1:
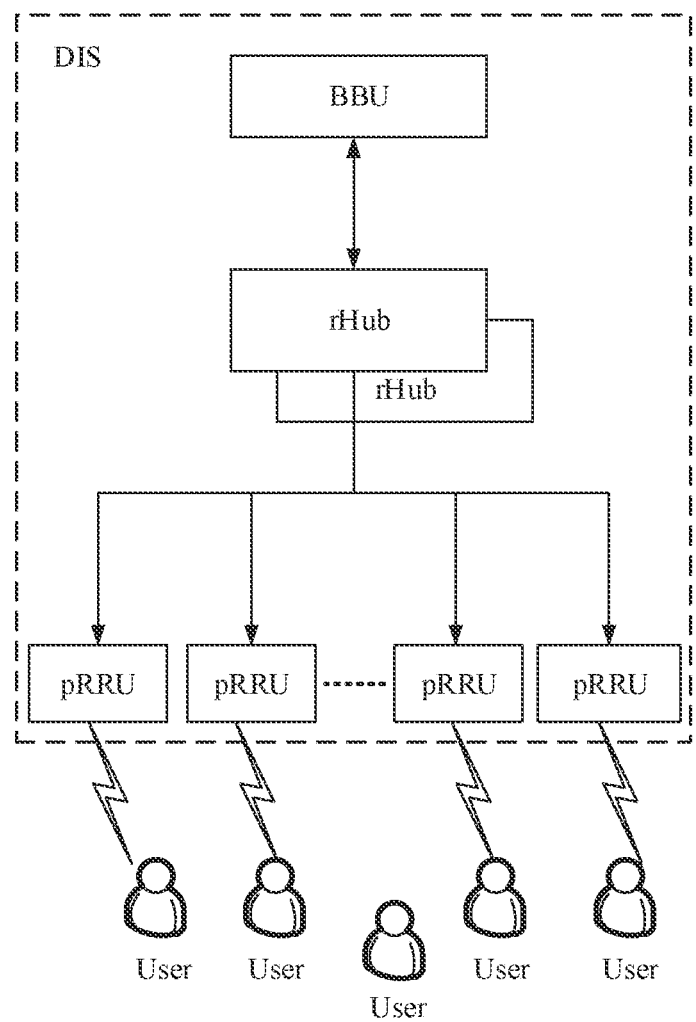
FIG. 1 is a schematic diagram of an architecture of an existing DIS.
Figure 2:
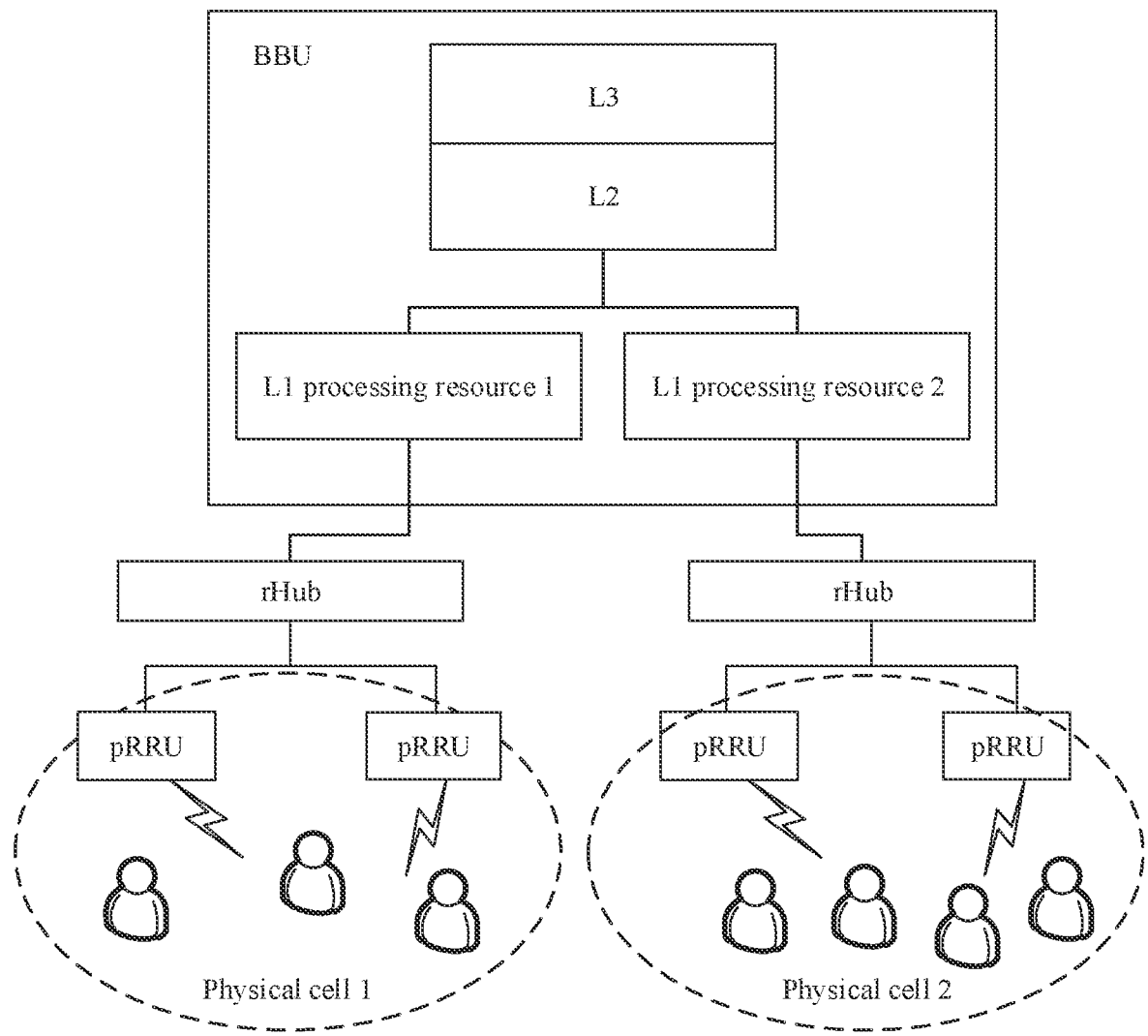
FIG. 2 is a schematic diagram of another architecture of an existing DIS.

For example, assuming that a physical cell 1 and a physical cell 2 exist in a coverage area of a DIS, a total amount of to-be-processed data in the coverage area of the DIS is less than that of one physical cell. If the DIS is shown in FIG. 2, one L1 processing resource is configured in the BBU for each physical cell. For example, an L1 processing resource 1 corresponding to a physical cell 1 and an L1 processing resource 2 corresponding to a physical cell 2 are configured. If the DIS is shown in FIG. 3, the BBU determines that the total amount of to-be-processed data in the data cache area is less than a data processing capacity of one physical cell, and configures one L1 processing resource 1, and the L1 processing resource is used to process the to-be-processed data. It can be learned from the above that, compared with that in FIG. 2, a configuration quantity of L1 processing resources in FIG. 3 is determined based on a service use situation of a user in the coverage area of the DIS, and flexible configuration is performed to improve utilization of the L1 processing resource.

Figure 5:
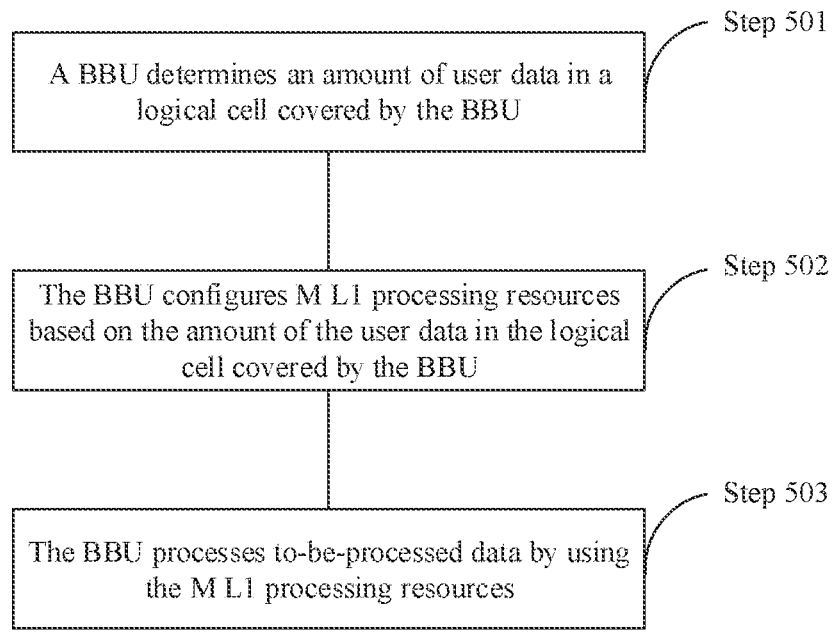
FIG. 5 is a flowchart of a data processing method according to an embodiment of this application.

Specifically, for the data processing process according to the embodiment of this application, refer to the following embodiment corresponding to FIG. 5.

Figure 4:
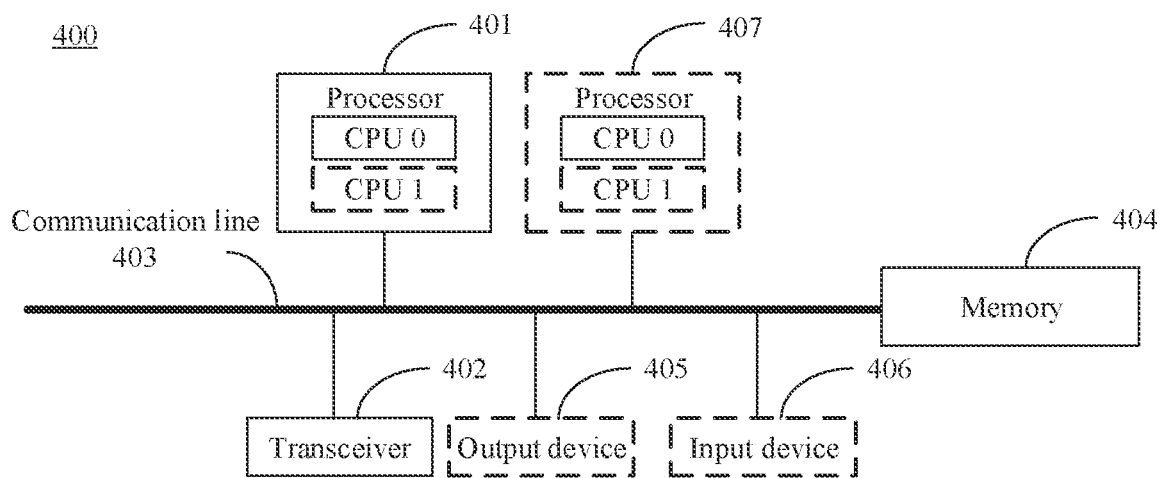
FIG. 4 is a schematic composition diagram of a communication apparatus according to an embodiment of this application.

During specific implementation, each device shown in FIG. 3, such as the BBU, the rHub, and the pRRU, may have a composition structure shown in FIG. 4 or include components shown in FIG. 4. FIG. 4 is a schematic diagram of a composition of a communication apparatus 400 according to an embodiment of this application. For example, the communication apparatus 400 may be a BBU or a chip or a system-on-a-chip in the BBU. As shown in FIG. 4, the communication apparatus 400 may include a processor 401, a transceiver 402, and a communication line 403. Further, the communication apparatus 400 may include a memory 404. The processor 401, the memory 404, and the transceiver 402 may be connected through the communication line 403.

The processor 401 is a central processing unit (CPU), a general purpose processor, a network processor (NP), a digital signal processor (DSP), a microprocessor, a microcontroller, a programmable logic device (PLD), or any combination thereof. The processor 401 may alternatively be another apparatus having a processing function, for example, a circuit, a component, or a software module. This is not limited.

The transceiver 402 is configured to communicate with another device or another communication network. The another communication network may be the Ethernet, a radio access network (RAN), a wireless local area network (WLAN), or the like. The transceiver 402 may be a module, a circuit, a transceiver, or any apparatus that can implement communication.

The communication line 403 is configured to transmit information between the components included in the communication apparatus 400.

The memory 404 is configured to store instructions. The instructions may be a computer program. The memory 404 may include a data cache area, and the data cache area may store to-be-processed data.

The memory 404 may be a read-only memory (ROM) or another type of static storage device that can store static information and/or instructions, may be a random access memory (RAM) or another type of dynamic storage device that can store information and/or instructions, or may be an electrically erasable programmable read-only memory (EEPROM), a compact disc read-only memory (CD-ROM) or another compact disc storage, an optical disc storage (including a compressed optical disc, a laser disc, an optical disc, a digital universal optical disc, a Blu-ray optical disc, or the like), a magnetic disk storage medium or another magnetic storage device, or the like. This is not limited.

It should be noted that the memory 404 may be independent of the processor 401, or may be integrated into the processor 401. The memory 404 may be configured to store instructions, program code, some data, or the like. The memory 404 may be located inside the communication apparatus 400, or may be located outside the communication apparatus 400. This is not limited. The processor 401 is configured to execute instructions stored in the memory 404 to perform the data processing method provided by the following embodiments of this application.

In an example, the processor 401 may include one or more CPUs, for example, a CPU 0 and a CPU 1 in FIG. 4.

In an optional implementation, the communication apparatus 400 includes a plurality of processors. For example, the communication apparatus 400 may further include a processor 407 in addition to the processor 401 in FIG. 4.

In an optional implementation, the communication apparatus 400 further includes an output device 405 and an input device 406. For example, the input device 406 is a keyboard, a mouse, a microphone, a joystick, or another device, and the output device 405 is a display, a speaker, or another device.

It should be noted that the communication apparatus 400 may be a desktop computer, a portable computer, a network server, a tablet computer, a wireless terminal, an embedded device, a chip system, or a device with a similar structure in FIG. 4. In addition, the composition structure shown in FIG. 4 does not constitute a limitation on the communication apparatus. In addition to the components shown in FIG. 4, the communication apparatus may include more or fewer components than those shown in the figure, or some components may be combined, or different component arrangements may be used.

In embodiments of this application, the chip system may include a chip, or may include a chip and another discrete component. In addition, mutual reference may be made to actions, terms, and the like in embodiments of this application. This is not limited. In embodiments of this application, names of messages exchanged between devices, names of parameters in the messages, or the like are merely examples. Other names may alternatively be used during specific implementation. This is not limited.

The data processing method according to the embodiment of this application is described below by taking the architecture shown in FIG. 3 as an example. Each device in the following embodiment, such as the BBU, the rHub, and the pRRU, may be provided with the components shown in FIG. 4. Details are not described.

FIG. 5 is a flowchart of a data processing method according to an embodiment of this application. As shown in FIG. 5, the method may include step 501 to step 503.

Step 501: A BBU determines an amount of user data in a logical cell covered by the BBU.

The amount of the user data in the logical cell covered by the BBU may be a total amount of to-be-processed data in the logical cell covered by the BBU, or may be a sum of to-be-processed data in all physical cells included in the logical cell covered by the BBU. For example, assuming that the logical cell covered by the BBU includes four physical cells: a physical cell 1 to a physical cell 4, and to-be-processed data of 50 users exists in each physical cell, the amount of the user data in the logical cell covered by the BBU is to-be-processed data of 200 users.

The to-be-processed data may include uplink data, and may also include downlink data. Details are not described. For example, the to-be-processed data in the logical cell covered by the BBU may be pre-stored in a data cache area, and the BBU can view the data cache area to determine the amount of the user data in the logical cell covered by the BBU.

Step 502: The BBU configures M L1 processing resources based on the amount of the user data in the logical cell covered by the BBU.

As mentioned above, the L1 processing resource may have baseband processing functions such as CRC check, scrambling, modulation, mapping precoding, resource mapping, OFDM signal generation, I/Q modulation, and intermediate and radio frequency processing.

M is an integer greater than or equal to 1, and a data processing capacity of the M L1 processing resources can meet the amount of the user data in the logical cell covered by the BBU. That a data processing capacity of the M L1 processing resources meets the amount of the user data in the logical cell covered by the BBU may include: The to-be-processed data includes M parts of user data, the M parts of user data correspond to the M L1 processing resources, and a data processing capacity of each L1 processing resource is greater than or equal to an amount of user data corresponding to the L1 processing resource.

For example, that the BBU configures M L1 processing resources based on the amount of the user data in the logical cell covered by the BBU may include: configuring one L1 processing resource if the amount of the user data in the logical cell covered by the BBU is less than or equal to a processing threshold of one physical cell; or configuring two or more L1 processing resources if the amount of the user data in the logical cell covered by the BBU is greater than a processing threshold of one physical cell, for example, configuring two L1 processing resources if the amount of the user data in the logical cell covered by the BBU is greater than a processing threshold of one physical cell and less than or equal to twice the processing threshold of one physical cell.

By analogy, three L1 processing resources are configured if the amount of the user data in the logical cell covered by the BBU is greater than twice the processing threshold of one physical cell and less than or equal to three times the processing threshold of one physical cell, and so on.

A processing threshold of a physical cell may be less than or equal to a maximum processing amount supported by the physical cell. For example, the processing threshold of the physical cell is set to 50% or another percentage of the maximum processing amount supported by the physical cell, which is not limited. Taking the processing threshold of the physical cell being 50% of the maximum processing amount supported by the physical cell as an example, if the maximum processing amount supported by the physical cell is data of 100 users, the processing threshold of the physical cell is data of 50 users.

Figure 6:
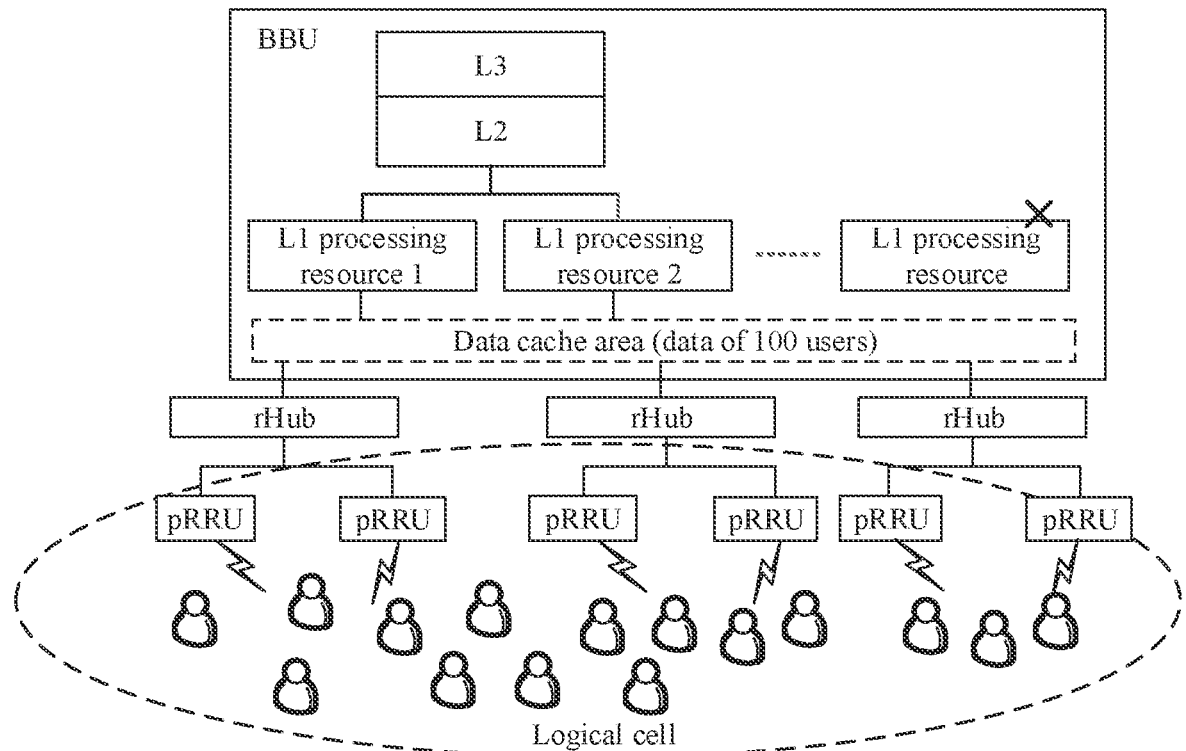
FIG. 6 is a schematic diagram of configuring an L1 processing resource according to an embodiment of this application.

For example, as shown in FIG. 6, assuming that to-be-processed data of 100 users exists in three physical cells included in the logical cell, and the processing threshold of one physical cell is data of 50 users, the BBU determines that the amount of the user data in the logical cell is greater than the processing threshold of one physical cell and less than twice the processing threshold of one physical cell, and divides the to-be-processed data in the logical cell into two parts, where each part includes data of 50 users; and configures two L1 processing resources for the two parts of data. It should be noted that FIG. 6 is an example drawing, and users shown in FIG. 6 are only an example description of 100 users.

Step 503: The BBU processes the to-be-processed data by using the M L1 processing resources.

Based on the method shown in FIG. 5, the BBU can dynamically configure the L1 processing resource based on the total amount of the to-be-processed data in the logical cell in coverage of the BBU, that is, a user service situation, so that the amount of user data that can be processed by the configured L1 processing resource can just meet the total amount of the to-be-processed data, and the to-be-processed data is processed by using the configured L1 processing resource. In this way, the configuration of the L1 processing resource can be associated with the user service situation in the coverage of the BBU, and the L1 processing resource can be decoupled from the physical cell. Unlike that in a conventional technology, there is no need to associate the L1 processing resources with the physical cell, and fixedly configure one L1 processing resource for one physical cell, thereby avoiding a problem of a waste of the L1 processing resource caused by one physical cell being fixedly configured with one L1 processing resource, and improving utilization of the L1 processing resource.

Further, after configuring the M L1 processing resources, the BBU may further determine a rHub corresponding to each L1 processing resource, and configure a first correspondence and a second correspondence. The first correspondence includes a correspondence between cache addresses of the M parts of user data and the M L1 processing resources, the second correspondence includes a correspondence between the cache addresses of the M parts of user data and N radio hubs rHubs, a cache address of each part of user data corresponds to at least one rHub, and N is an integer greater than or equal to 1. In this way, a data path between the L1 processing resource and the rHub can be established.

Figure 7A:
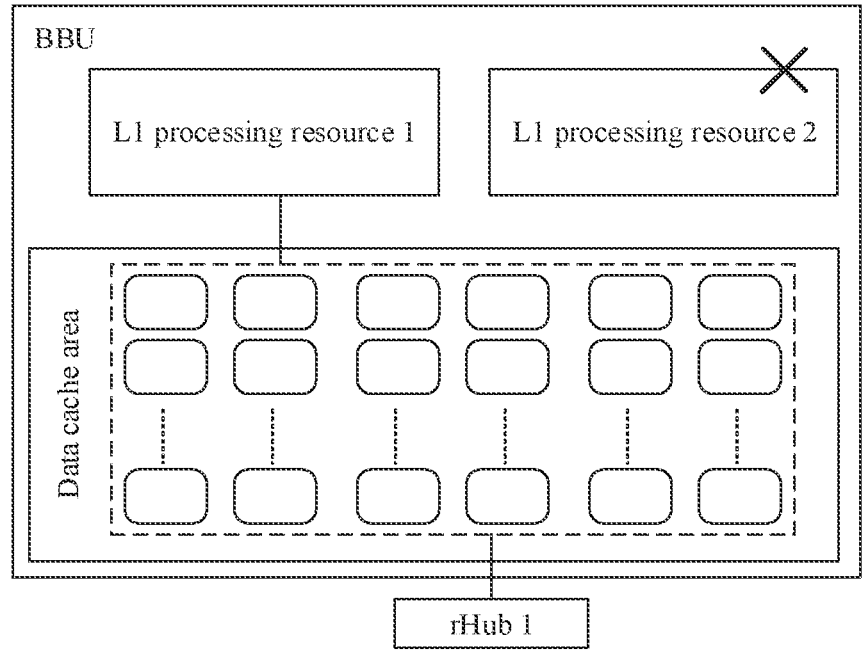
FIG. 7a is a schematic diagram of a data path established between an L1 processing resource and a rHub according to an embodiment of this application.

For example, as shown in FIG. 7*a*, an amount of user data in a data cache area is less than a processing threshold of one physical cell, and one L1 processing resource is configured. The BBU may enable a cache address corresponding to the user data in the data cache area to correspond to the L1 processing resource 1 and enable the cache address corresponding to the user data in the data cache area to correspond to a rHub 1, to establish a data path between the L1 processing resource 1 and the rHub 1.

Figure 7B:
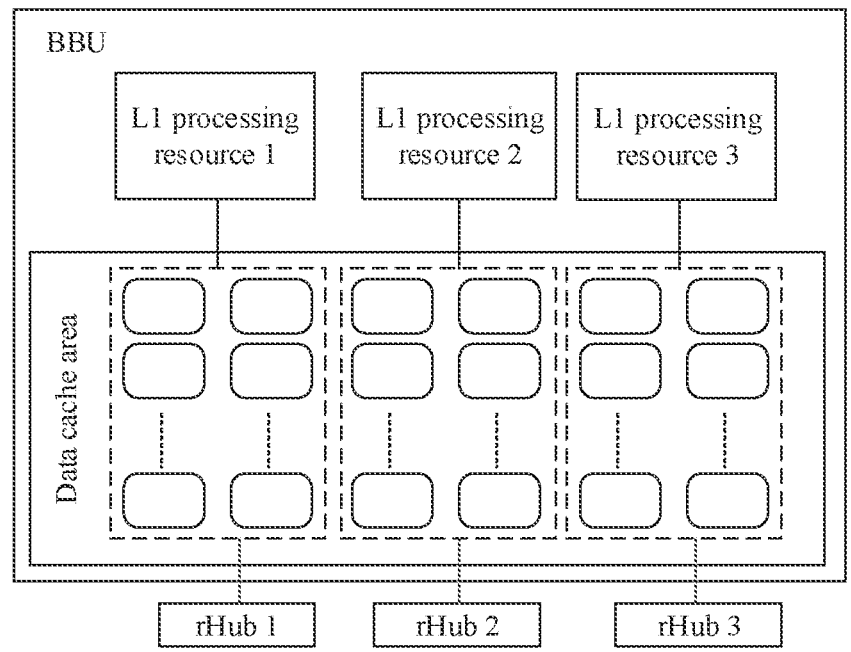
FIG. 7b is a schematic diagram of another data path established between an L1 processing resource and a rHub according to an embodiment of this application.

For another example, as shown in FIG. 7*b*, an amount of user data in a data cache area is greater than a processing threshold of one physical cell, and three L1 processing resources are configured. The BBU enables a cache address of each part of user data in the data cache area to correspond to each L1 processing resource. For example, a cache address of the first part of user data corresponds to an L1 processing resource 1, a cache address of the second part of user data corresponds to an L1 processing resource 2, and a cache address of the third part of user data corresponds to an L1 processing resource 3. In addition, the cache addresses of the parts of user data are enabled to correspond to a plurality of rHubs. For example, the cache address of the first part of user data corresponds to a rHub 1, the cache address of the second part of user data corresponds to a rHub 2, and the cache address of the third part of user data corresponds to a rHub 3. In this way, data paths between a plurality of L1 processing resources and a plurality of rHubs are established.

For example, that the BBU processes the to-be-processed data by using the M L1 processing resources may include:

The BBU determines an L1 processing resource corresponding to a cache address of any one of the M parts of user data based on the cache address of the user data and the first correspondence, and processes the user data by using the determined L1 processing resource.

Further, in the method shown in FIG. 5, when the to-be-processed data is downlink data, the method further includes: The BBU determines at least one rHub corresponding to the cache address of the user data based on the second correspondence, and sends user data processed by using the L1 processing resource to the at least one rHub; or when the to-be-processed data is uplink data sent to the BBU by a rHub, the method further includes: The BBU determines, based on the second correspondence, a cache address of the user data sent by the rHub, determines an L1 processing resource corresponding to the cache address of the user data based on the first correspondence, and processes the uplink data by using the L1 processing resource.

It should be noted that the BBU sends user data processed by using the L1 processing resource to the at least one rHub may include: The BBU sends, on different time-frequency resources, the user data processed by using the L1 processing resource to the at least one rHub, or sends, on a same time-frequency resource, the user data processed by using the L1 processing resource to the at least one rHub, which is not limited.

Further, in the method shown in FIG. 5, to reduce power consumption of the pRRU and reduce interference between multi-path transmission, the method further includes: The BBU measures signal quality of at least one pRRU connected to a rHub connected to the BBU, and sends configuration information to the rHub based on a measurement result; and the rHub receives the configuration information, turns off some of the at least one pRRU based on the configuration information, and keeps the remaining ones of the at least one pRRU in an on state.

The configuration information may be used to indicate an on or off state of each of the at least one pRRU. Optionally, a pRRU with relatively good signal quality is in an on state, a pRRU with relatively poor signal quality or signal quality below a threshold is in an off state, and the threshold may be set as required, which is not limited.

For example, when the rHub is connected to n pRRUs, where n is an integer greater than or equal to 1, the configuration information may include n binary bits corresponding to the n pRRUs, and each binary bit may be used to indicate an on or off state of a pRRU corresponding to the binary bit. For example, a binary bit "0" may be used to indicate to turn off a pRRU, and a binary bit "1" may be used to indicate to turn on a pRRU.

The signal quality of the pRRU may include reference signal received power (RSRP) and the like. The BBU may measure the signal quality of the at least one pRRU connected to the rHub in an existing manner, which is not limited.

In this embodiment of this application, turning on the pRRU may include connecting a path between the rHub and the pRRU, increasing power of the pRRU, and the like. Turning off the pRRU may include disconnecting the path between the rHub and the pRRU, reducing the power of the pRRU, and the like, which is not limited.

Further, the BBU may periodically measure the signal quality of the at least one pRRU connected to the rHub. If it is found based on a current measurement result that a pRRU that needs to be turned on or off is different from a pRRU that is currently turned on or off, the BBU updates the configuration information based on the measurement result, and sends updated configuration information to the rHub.

Figure 8A:
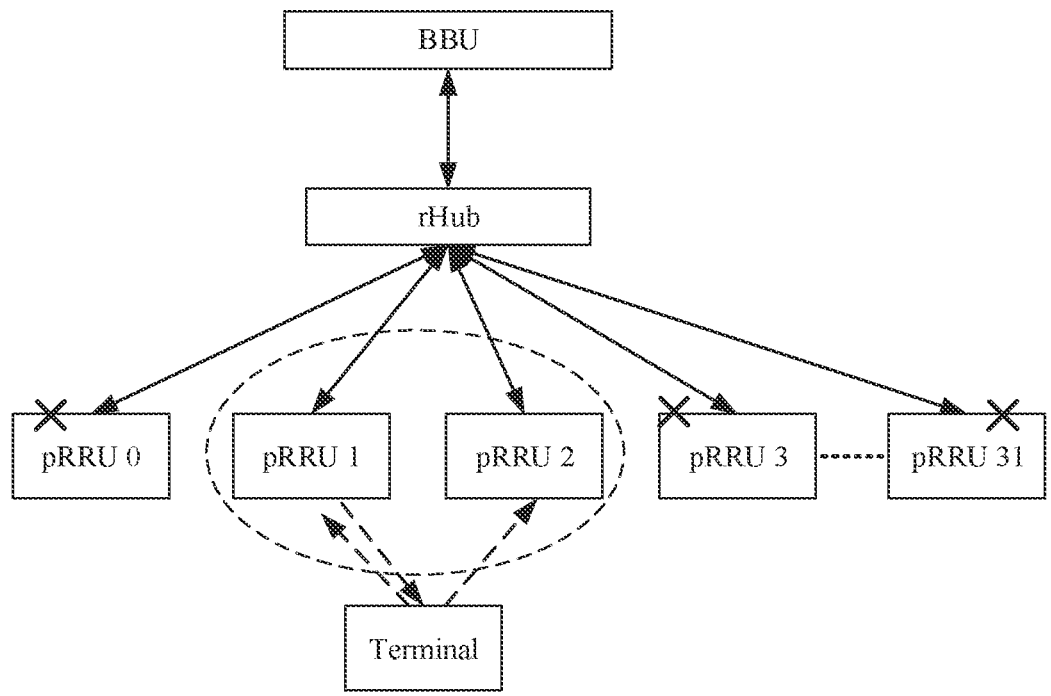
FIG. 8a is a schematic diagram of turning off a radio frequency function of some pRRUs according to an embodiment of this application.
Figure 8B:
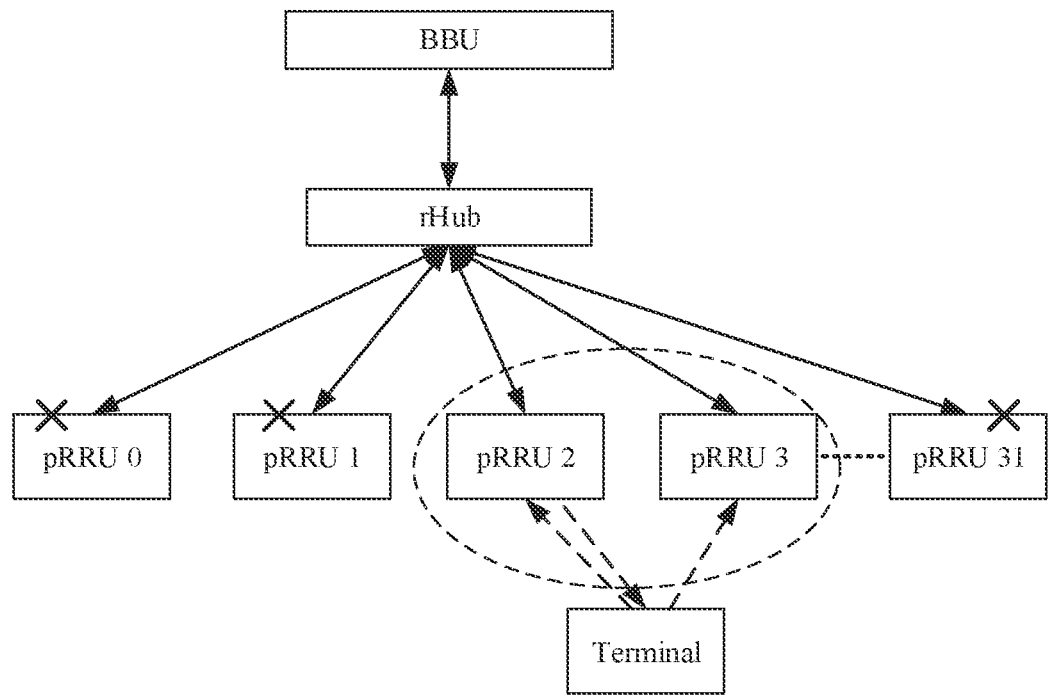
FIG. 8b is another schematic diagram of turning off a radio frequency function of some pRRUs according to an embodiment of this application.

For example, as shown in FIG. 8a, a rHub connected to a BBU is connected to a plurality of pRRUs. The BBU measures that signal quality of a pRRU 1 and a pRRU 2 among the plurality of pRRUs connected to the rHub is relatively good, and signal quality of other pRRUs is relatively poor, and then the BBU may send configuration information "01100 . . . " to the rHub to indicate to turn on the pRRU 1 and the pRRU 2 and turn off the other pRRUs. For another example, as shown in FIG. 8b, the BBU measures again the plurality of pRRUs connected to the rHub, and finds that signal quality of the pRRU 2 and a pRRU 3 among the plurality of pRRUs connected to the rHub is relatively good, and signal quality of other pRRUs is relatively poor, and then the BBU may send updated configuration information "00110 . . . " to the rHub to indicate to turn on the pRRU 2 and the pRRU 3 and turn off the other pRRUs.

The solutions provided in embodiments of this application are mainly described above from a perspective of interaction between the devices. It may be understood that, to implement the foregoing functions, the BBU includes corresponding hardware structures and/or software modules for performing the functions. A person skilled in the art should be easily aware that, in combination with the examples described in embodiments disclosed in this specification, algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the BBU may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in embodiments of this application, division into modules is an example and is merely logical function division, and may be other division in an actual implementation.

Figure 9:
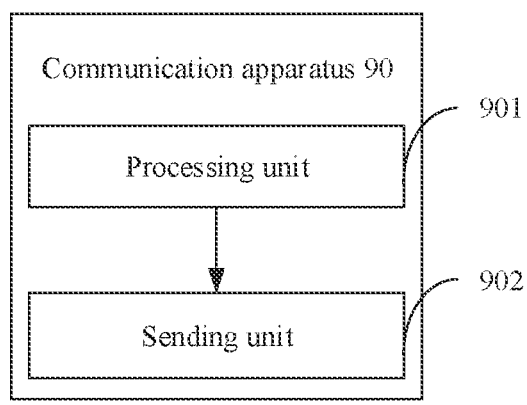
FIG. 9 is a schematic diagram of a structure of a communication apparatus 90 according to an embodiment of this application.

When each function module is obtained through division based on each corresponding function, FIG. 9 is a diagram of a structure of a communication apparatus 90. The communication apparatus 90 may be a BBU, a chip in the BBU, or a system-on-a-chip. The communication apparatus 90 may be configured to perform a function of the BBU in the foregoing embodiments. The communication apparatus 90 shown in FIG. 9 includes a processing unit 901 and a sending unit 902.

The processing unit 901 is configured to: determine a total amount of to-be-processed data in a logical cell covered by the BBU, configure, based on the total amount of the to-be-processed data, M L1 processing resources whose data processing capacity meets an amount of user data in the logical cell covered by the BBU, and process the to-be-processed data by using the M L1 processing resources. For example, the processing unit 901 may support the communication apparatus 90 in performing step 501, step 502, and step 503.

Further, the communication apparatus 90 may further include a sending unit 902. The sending unit 902 may be configured to send processed data to a rHub.

For a specific implementation of the communication apparatus 90, refer to behavior functions of the BBU in the data processing methods shown in FIG. 5 to FIG. 9. Details are not described again.

In another possible implementation, the processing unit 901 in FIG. 9 may be replaced with a processor, and the sending unit 902 may be replaced with a transceiver or a transceiver unit. A function of the processing unit 901 may be integrated into the processor, and a function of the sending unit 902 may be integrated into the transceiver or the transceiver unit. Further, the communication apparatus 90 shown in FIG. 9 may further include a memory. When the processing unit 901 is replaced with the processor, and the sending unit 902 is replaced with the transceiver or the transceiver unit, the communication apparatus 90 in this embodiment of this application may be the communication apparatus shown in FIG. 4.

An embodiment of this application further provides a computer-readable storage medium. All or some of the procedures in the foregoing method embodiments may be completed by a computer program instructing related hardware. The program may be stored in the foregoing computer-readable storage medium. When the program is executed, the procedures in the foregoing method embodiments may be included. The computer-readable storage medium may be an internal storage unit of the communication apparatus (including a data transmit end and/or a data receive end) of any one of the foregoing embodiments, for example, a hard disk or memory of the communication apparatus. Alternatively, the computer-readable storage medium may be an external storage device of the communication apparatus, for example, a plug-in hard disk, a smart media card (SMC), a secure digital (SD) card, or a flash card that is disposed on the communication apparatus. Further, the computer-readable storage medium may include both an internal storage unit and an external storage device of the communication apparatus. The computer-readable storage medium is configured to store the computer program and store other programs and data that are required by the communication apparatus. The computer-readable storage medium may be further configured to temporarily store data that has been output or is to be output.

It should be noted that, in the specification, claims, and accompanying drawings of this application, the terms "first", "second", and the like are intended to distinguish between different objects but do not indicate a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes unlisted steps or units, or optionally further includes other inherent steps or units of the process, the method, the product, or the device.

It should be understood that, in this application, the term "at least one (item)" means one or more, the term "a plurality of" means two or more than two, "at least two (items) means two, three, or more than three, and the term "and/or" is used to describe an association relationship for describing associated objects and represent that three relationships may exist. For example, "A and/or B" may represent three cases: Only A exists, only B exists, and both A and B exists. A and B may be singular or plural. The character "/" usually indicates an "or" relationship between the associated objects. "At least one of the following items (pieces)" or a similar expression thereof indicates any combination of these items, including any combination of singular items (pieces) or plural items (pieces). For example, at least one item (piece) of a, b, or c may represent: a, b, c, "a and b", "a and c", "b and c", or "a, b, and c", where a, b, and c may be singular or plural.

The foregoing descriptions about implementations allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

We claim:

1. A data processing method, wherein the method comprises:
    determining, by a baseband unit (BBU), an amount of user data in a logical cell covered by the BBU, wherein the amount of the user data in the logical cell covered by the BBU is a total amount of to-be-processed data in the logical cell covered by the BBU;
    configuring, by the BBU, M layer 1 (L1) processing resources based on the amount of the user data in the logical cell covered by the BBU, wherein a data processing capacity of the M L1 processing resources meets the amount of the user data in the logical cell covered by the BBU, and M is an integer greater than or equal to 1; and
    processing, by the BBU, the to-be-processed data by using the M L1 processing resources.

2. The method according to claim 1, wherein that a data processing capacity of the M L1 processing resources meets the amount of the user data in the logical cell covered by the BBU comprises:
    the to-be-processed data comprises M parts of user data, the M parts of user data correspond to the M L1 processing resources, and a data processing capacity of each L1 processing resource is greater than or equal to an amount of one part of user data corresponding to the L1 processing resource.

3. The method according to claim 1, wherein the configuring, by the BBU, M L1 processing resources based on the amount of the user data in the logical cell covered by the BBU comprises:
configuring one L1 processing resource if the amount of the user data in the logical cell covered by the BBU is less than or equal to a processing threshold of one physical cell; or
configuring two L1 processing resources if the amount of the user data in the logical cell covered by the BBU is greater than a processing threshold of one physical cell and less than or equal to twice the processing threshold of one physical cell.

4. The method according to claim 1, wherein the to-be-processed data comprises M parts of user data, and the method further comprises:
configuring, by the BBU, a first correspondence, wherein the first correspondence comprises a correspondence between cache addresses of the M parts of user data and the M L1 processing resources; and
configuring, by the BBU, a second correspondence, wherein the second correspondence comprises a correspondence between the cache addresses of the M parts of user data and N radio hubs (rHubs), a cache address of each part of user data corresponds to at least one rHub, and N is an integer greater than or equal to 1.

5. The method according to claim 4, wherein the processing, by the BBU, the to-be-processed data by using the M L1 processing resources comprises:
determining, by the BBU, an L1 processing resource corresponding to a cache address of any one of the M parts of user data based on the cache address of the user data and the first correspondence, and processing the user data by using the determined L1 processing resource.

6. The method according to claim 4, wherein the method further comprises:
determining, by the BBU, at least one rHub corresponding to the cache address of the user data based on the second correspondence, and sending user data processed by using the L1 processing resource to the at least one rHub.

7. The method according to claim 1, wherein the method further comprises:
measuring, by the BBU, signal quality of at least one pico remote radio unit (pRRU) connected to a rHub, wherein the rHub is connected to the BBU; and
sending, by the BBU, configuration information to the rHub based on a measurement result, wherein the configuration information is used to indicate an on or off state of each of the at least one pRRU.

8. A baseband unit (BBU), comprising:
at least one processor; and
one or more memories coupled to the at least one processor and storing programming instructions for execution by the at least one processor to:
determine an amount of user data in a logical cell covered by the BBU, wherein the amount of the user data in the logical cell covered by the BBU is a total amount of to-be-processed data in the logical cell covered by the BBU;
configure M layer 1 (L1) processing resources based on the amount of the user data in the logical cell covered by the BBU; and
process the to-be-processed data by using the M L1 processing resources, wherein a data processing capacity of the M L1 processing resources meets the amount of the user data in the logical cell covered by the BBU, and M is an integer greater than or equal to 1.

9. The BBU according to claim 8, wherein that a data processing capacity of the M L1 processing resources meets the amount of the user data in the logical cell covered by the BBU comprises:
the to-be-processed data comprises M parts of user data, the M parts of user data correspond to the M L1 processing resources, and a data processing capacity of each L1 processing resource is greater than or equal to an amount of one part of user data corresponding to the L1 processing resource.

10. The BBU according to claim 8, wherein the one or more memories store programming instructions for execution by the at least one processor to:
configure one L1 processing resource if the amount of the user data in the logical cell covered by the BBU is less than or equal to a processing threshold of one physical cell; or
configure two L1 processing resources if the amount of the user data in the logical cell covered by the BBU is greater than a processing threshold of one physical cell and less than or equal to twice the processing threshold of one physical cell.

11. The BBU according to claim 8, wherein the to-be-processed data comprises M parts of user data, and the one or more memories store programming instructions for execution by the at least one processor to:
configure a first correspondence and a second correspondence, wherein the first correspondence comprises a correspondence between cache addresses of the M parts of user data and the M L1 processing resources, the second correspondence comprises a correspondence between the cache addresses of the M parts of user data and N radio hubs (rHubs), a cache address of each part of user data corresponds to at least one rHub, and N is an integer greater than or equal to 1.

12. The BBU according to claim 11, wherein the one or more memories store programming instructions for execution by the at least one processor to:
determine an L1 processing resource corresponding to a cache address of any one of the M parts of user data based on the cache address of the user data and the first correspondence, and process the user data by using the determined L1 processing resource.

13. The BBU according to claim 11, wherein the one or more memories store programming instructions for execution by the at least one processor to:
determine at least one rHub corresponding to the cache address of the user data based on the second correspondence, and send user data processed by using the L1 processing resource to the at least one rHub.

14. The BBU according to claim 8, wherein the one or more memories store programming instructions for execution by the at least one processor to:
measure signal quality of at least one pico remote radio unit (pRRU) connected to a rHub, wherein the rHub is connected to the BBU; and
send configuration information to the rHub based on a measurement result, wherein the configuration information is used to indicate an on or off state of each of the at least one pRRU.

15. A non-transitory computer-readable medium storing computer instructions, that when executed by one or more hardware processors, cause the one or more hardware processors to perform operations comprising:
  determining, by a baseband unit (BBU), an amount of user data in a logical cell covered by the BBU, wherein the amount of the user data in the logical cell covered by the BBU is a total amount of to-be-processed data in the logical cell covered by the BBU;
  configuring, by the BBU, M layer 1 (L1) processing resources based on the amount of the user data in the logical cell covered by the BBU, wherein a data processing capacity of the M L1 processing resources meets the amount of the user data in the logical cell covered by the BBU, and M is an integer greater than or equal to 1; and
  processing, by the BBU, the to-be-processed data by using the M L1 processing resources.

16. The non-transitory computer-readable medium according to claim 15, wherein that a data processing capacity of the M L1 processing resources meets the amount of the user data in the logical cell covered by the BBU comprises:
  the to-be-processed data comprises M parts of user data, the M parts of user data correspond to the M L1 processing resources, and a data processing capacity of each L1 processing resource is greater than or equal to an amount of one part of user data corresponding to the L1 processing resource.

17. The non-transitory computer-readable medium according to claim 15, wherein the configuring, by the BBU, M L1 processing resources based on the amount of the user data in the logical cell covered by the BBU comprises:
  configuring one L1 processing resource if the amount of the user data in the logical cell covered by the BBU is less than or equal to a processing threshold of one physical cell; or
  configuring two L1 processing resources if the amount of the user data in the logical cell covered by the BBU is greater than a processing threshold of one physical cell and less than or equal to twice the processing threshold of one physical cell.

18. The non-transitory computer-readable medium according to claim 15, wherein the to-be-processed data comprises M parts of user data, and the operations further comprise:
  configuring, by the BBU, a first correspondence, wherein the first correspondence comprises a correspondence between cache addresses of the M parts of user data and the M L1 processing resources; and
  configuring, by the BBU, a second correspondence, wherein the second correspondence comprises a correspondence between the cache addresses of the M parts of user data and N radio hubs (rHubs), a cache address of each part of user data corresponds to at least one rHub, and N is an integer greater than or equal to 1.

19. The non-transitory computer-readable medium according to claim 18, wherein the processing, by the BBU, the to-be-processed data by using the M L1 processing resources comprises:
  determining, by the BBU, an L1 processing resource corresponding to a cache address of any one of the M parts of user data based on the cache address of the user data and the first correspondence, and processing the user data by using the determined L1 processing resource.

20. The non-transitory computer-readable medium according to claim 18, wherein the operations further comprise:
  determining, by the BBU, at least one rHub corresponding to the cache address of the user data based on the second correspondence, and sending user data processed by using the L1 processing resource to the at least one rHub.

* * * * *